(12) United States Patent
Huang et al.

(10) Patent No.: US 12,147,290 B2
(45) Date of Patent: Nov. 19, 2024

(54) CAPTURING AND USING DYNAMIC INFORMATION TO MANAGE FIELD REPLACE UNITS

(71) Applicant: Quanta Computer Inc., Taoyuan (TW)

(72) Inventors: Jyun-Jie Huang, Taoyuan (TW); Shu-Ming Chu, Taoyuan (TW); Hsin-Yu Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 68 days.

(21) Appl. No.: 18/168,557

(22) Filed: Feb. 13, 2023

(65) Prior Publication Data
US 2024/0272973 A1 Aug. 15, 2024

(51) Int. Cl.
*G06F 11/00* (2006.01)
*G06F 11/07* (2006.01)

(52) U.S. Cl.
CPC ...... *G06F 11/0727* (2013.01); *G06F 11/0769* (2013.01); *G06F 11/0784* (2013.01); *G06F 11/0787* (2013.01); *G06F 11/079* (2013.01)

(58) Field of Classification Search
CPC ............. G06F 11/0727; G06F 11/0769; G06F 11/0784; G06F 11/0787; G06F 11/079; G06F 11/3055; G06F 11/3058; G06F 11/3065
See application file for complete search history.

(56) References Cited

U.S. PATENT DOCUMENTS

| | | | |
|---|---|---|---|
| 8,161,324 B2* | 4/2012 | Calkin | G06F 11/0727 714/26 |
| 10,552,729 B2* | 2/2020 | Bacha | G06N 3/045 |
| 2004/0078634 A1* | 4/2004 | Gilstrap | G06Q 10/06 714/47.3 |

(Continued)

FOREIGN PATENT DOCUMENTS

| | | |
|---|---|---|
| CN | 110555237 A | 12/2019 |
| TW | 200931806 A | 7/2009 |

OTHER PUBLICATIONS

TW Office Action for Application No. 112117628 mailed Jul. 11, 2024, w/ First Office Action Summary, 5 pp.

(Continued)

*Primary Examiner* — Marc Duncan
(74) *Attorney, Agent, or Firm* — NIXON PEABODY LLP

(57) ABSTRACT

An example computer-implemented method is for managing a compute system with FRUs. The computer-implemented method includes receiving status information corresponding to the FRUs. The status information is collected from the FRUs in response to the compute system being powered on. The computer-implemented method also includes, in response to a predetermined condition being met, sending for each of the FRUs, one or more instructions to erase a dynamic portion of electrically erasable programmable read-only memory (EEPROM) located at a respective FRU; and sending for each of the FRUs, one or more instructions to write a portion of the status information corresponding to the (Continued)

respective FRU in the dynamic portion of the EEPROM at the respective FRU. Moreover, the EEPROM at each FRU includes the dynamic portion and a read-only portion.

18 Claims, 6 Drawing Sheets

(56) References Cited

U.S. PATENT DOCUMENTS

| | | | | |
|---|---|---|---|---|
| 2004/0162945 A1* | 8/2004 | King | ............... | G06F 11/0727 714/E11.019 |
| 2004/0221198 A1* | 11/2004 | Vecoven | ............ | G06F 11/0772 714/E11.026 |
| 2013/0132700 A1 | 5/2013 | Liu et al. | | |
| 2016/0378343 A1* | 12/2016 | Long | ................ | G06F 3/0659 711/103 |
| 2020/0004621 A1* | 1/2020 | Athmaram | ......... | G06F 11/3058 |

OTHER PUBLICATIONS

TW Search Report for Application No. 112117628 mailed Jul. 11, 2024, w/ First Office Action, 1 p.

* cited by examiner

CAPTURING AND USING DYNAMIC INFORMATION TO MANAGE FIELD REPLACE UNITS

TECHNICAL FIELD

The present invention relates to data storage systems, and more particularly, to the process of monitoring and managing devices like field replace units.

BACKGROUND

Computational systems are often complex and expensive, making failures experienced by these systems a significant issue. While failures experienced by computational systems may result from localized issues, lack of accessibility in the past often prevented these local issues from being resolved without replacing the entire system. As a result, the process of maintaining computational systems faced significant inefficiencies in the past.

Devices like field replace units (FRUs) have been implemented in an attempt to counteract the inefficiencies mentioned above. FRUs are electrical devices that can be removed from a more complex electrical system or other piece of electronic equipment, and replaced. FRUs thereby allow for specific portions of a larger system to be replaced. This allows for issues to be resolved without repairing or replacing the system as a whole.

While FRUs add desirable granularity to the process of repairing larger systems, they often have sparse information, are difficult to access, and cause significant inefficiencies for the system as a whole. There is also no historical information stored for these FRUs, making it impossible to know what has previously happened to the FRUs. As a result, conventional implementations have suffered significant inefficiencies attempting to implement and manage FRUs. Moreover, these inefficiencies have been unresolved.

Thus, there is a need for methods, computer program products, and systems that are able to successfully and efficiently manage systems having FRUs. Moreover, these improvements must be achieved without negatively affecting performance of the system.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

It should also be noted that while various embodiments herein are described in the context of flash memory, this is in no way intended to be limiting. Embodiments herein may be implemented in systems having any desired type of random access, non-volatile memory that would benefit from the various achievements herein, e.g., as would be appreciated by one skilled after reading the present description.

An example computer-implemented method is for managing a compute system with FRUs. The computer-implemented method includes receiving status information corresponding to the FRUs. The status information is collected from the FRUs in response to the compute system being powered on (e.g., during a "booting" process). The computer-implemented method also includes, in response to a predetermined condition being met, sending for each of the FRUs, one or more instructions to erase a dynamic portion of electrically erasable programmable read-only memory (EEPROM) located at a respective FRU; and sending for each of the FRUs, one or more instructions to write a portion of the status information corresponding to the respective FRU in the dynamic portion of the EEPROM at the respective FRU. Moreover, the EEPROM at each FRU includes the dynamic portion and a read-only portion.

In some implementations, the computer-implemented method includes receiving a status request for one of the FRUs, and directing the status request to the FRU. Additionally, status information is received directly from the FRU, and the received status information is used to satisfy the status request.

In some implementations, identifying whether the predetermined condition has been met includes determining whether a current fill level of the dynamic portion of EEPROM is outside a predetermined range. In response to determining that the current fill level of the dynamic portion of EEPROM is outside the predetermined range, a warning notification is issued. Moreover, in response to being instructed to clear the dynamic portion of EEPROM, one or more instructions are sent to erase the status information stored in the dynamic portion of EEPROM. In some implementations, the predetermined condition is met in response to receiving the status information corresponding to the FRUs.

In other implementations, the method includes receiving error information corresponding to an error that occurred at one of the FRUs, and evaluating the error information to determine one of the FRUs that experienced the error. One or more instructions are further sent to the one of the FRU that experienced the error. One or more instructions may also be sent that cause the error information to be written in the dynamic portion of EEPROM at the one of the FRUs. Depending on the implementation, the error information may include one or more details selected from the group consisting of: a status of the FRU that experienced the error, an error type, and an error count of the FRU that experienced the error.

In still further implementations, the method includes receiving status information from memory devices that do not include EEPROM. The memory devices without EEPROM are part of the compute system. Accordingly, the received status information is stored in a dynamic portion of a central EEPROM, the central EEPROM having the dynamic portion and a read-only portion. Depending on the implementation, the status information may include error counts corresponding to the FRUs, and the static information may include a manufacture date, manufacturer, product identifier, and serial number. In still other implementations, the computer-implemented method is performed by a baseboard management controller (BMC).

An example computer program product is for managing a compute system with FRUs. The computer program product includes a computer readable storage medium having program instructions embodied therewith. Moreover, the program instructions are readable and/or executable by a processor to cause the processor to perform the foregoing method.

An example compute system includes a plurality of FRUs, each of the FRUs including EEPROM having a dynamic portion and a read-only portion. The system further includes a processor, and logic integrated with and/or executable by the processor. Moreover, the logic is configured to: perform the foregoing method.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1A:
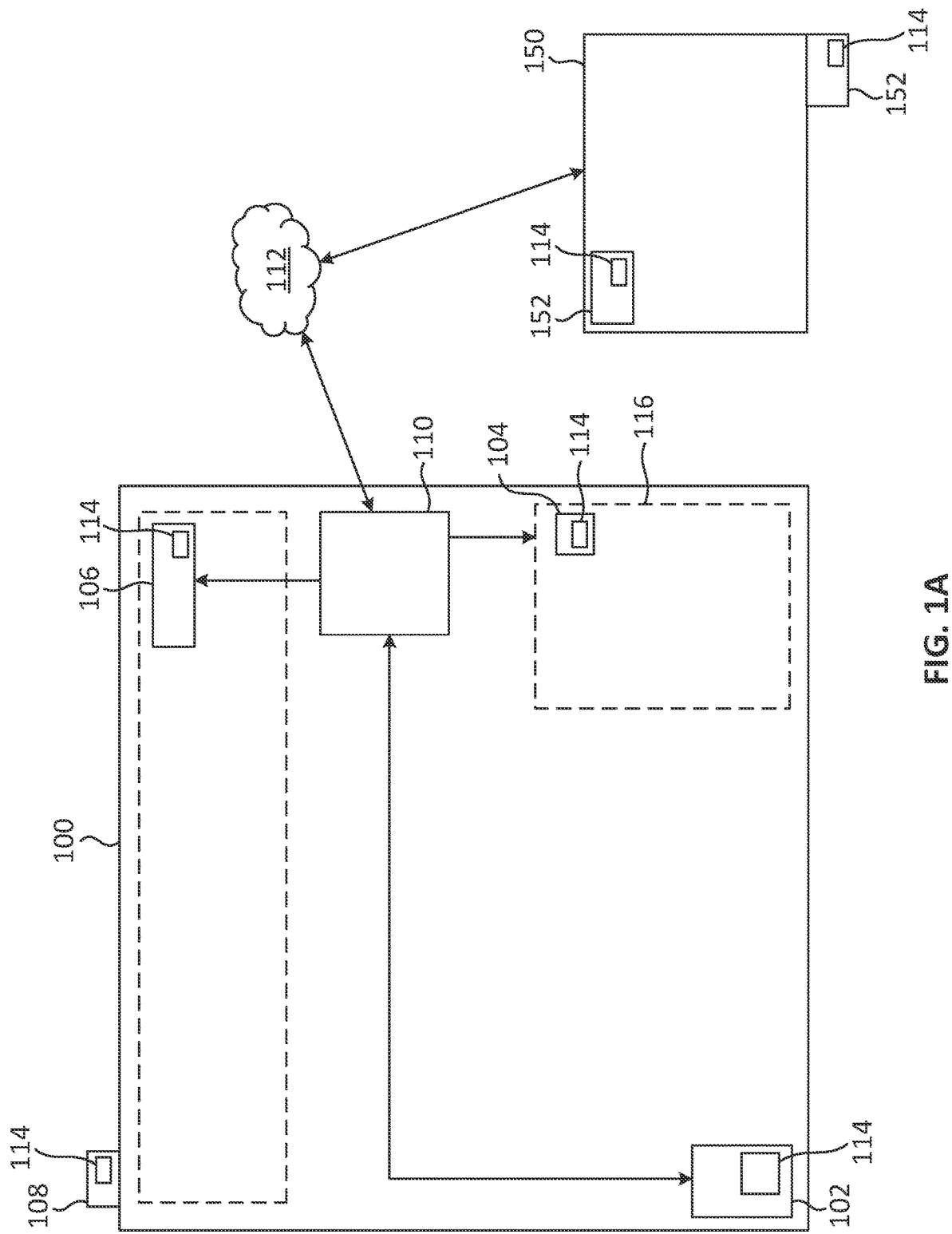
FIG. 1A is a representational view of a system architecture, according to certain aspects of the present disclosure.

The present disclosure is directed toward a computer-implemented method for managing a system having FRUs. The computer-implemented method includes receiving status information corresponding to the FRUs. The status information is collected from the FRUs in response to the system being powered on (e.g., during a "booting" process). The computer-implemented method also includes, for each of the FRUs: sending one or more instructions to erase a dynamic portion of electrically erasable programmable read-only memory (EEPROM) located at a given FRU in response to a predetermined condition being met; and sending one or more instructions to write a portion of the status information corresponding to the given FRU in the dynamic portion of the EEPROM at the given FRU. Moreover, the EEPROM at each FRU includes the dynamic portion and a read-only portion.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical", "horizontal", "parallel", and "perpendicular" are intended to additionally include "within 3-5% of" a vertical, horizontal, parallel, or perpendicular orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

As previously mentioned, Computational systems are often complex and expensive, making failures experienced by these systems a significant issue. While failures experienced by computational systems may result from localized issues, lack of accessibility in the past often prevented these local issues from being resolved without replacing the entire system. Devices like FRUs have been implemented in an attempt to counteract these inefficiencies.

While FRUs add desirable granularity to the process of repairing larger systems, they often have sparse information, are difficult to access, and cause significant inefficiencies for the system as a whole. There is also no historical information stored for these FRUs, making it impossible to know what has previously happened to the FRUs. As a result, conventional implementations have suffered significant inefficiencies attempting to implement and manage FRUs. Moreover, these inefficiencies have been unresolved.

In sharp contrast to these conventional shortcomings, various ones of the implementations included herein are able to successfully and efficiently manage systems having FRUs. Moreover, these improvements are achieved without negatively affecting performance of the system, e.g., as will be described in further detail below.

Looking now to FIG. 1A, a compute system 100 having a plurality of FRUs 102, 104, 106, 108 is depicted in accordance with one implementation. As an option, the present compute system 100 may be implemented in conjunction with features from any other implementation listed herein, such as those described with reference to the other FIGS. However, such compute system 100 and others presented herein may be used in various applications and/or in permutations which may or may not be specifically described in the illustrative implementations listed herein. Further, the compute system 100 presented herein may be used in any desired environment. Thus FIG. 1A (and the other FIGS.) may be deemed to include any possible permutation.

As noted above, the compute system 100 includes a plurality of FRUs 102, 104, 106, 108. The FRUs 102, 104, 106, 108 may be positioned in any desired location in the compute system 100. Again, FRUs desirably provide granularity to the process of repairing larger systems. For example, a server 116 or server system boards may include one or more FRUs that allow for the replacement of components, e.g., such as mainboards, power supplies, electric fans, communication cables, etc.

It follows that each of the FRUs 102, 104, 106, 108 in the compute system 100 may be implemented in any desired sub-system, component (e.g., electrical component), etc., that would be apparent to one skilled in the art after reading the present description. According to an example, which is in no way intended to limit the invention, FRU 104 may be a control module.

Each of the FRUs 102, 104, 106, 108 is preferably configured such that it may be easily removed from the compute system 100 and replaced. In some implementations, the FRUs 102, 104, 106, 108 may be electrically coupled to a remainder of the compute system 100 using easily attachable/detachable electrical connections, e.g., such as electrically conductive fasteners, selectively positionable locking levers, electrically conductive friction fittings, etc., or any other design that allows for the respective one of the FRUs 102, 104, 106, 108 to be removed from larger compute system 100 as desired. Moreover, a replacement FRU may be implemented using the same or different easily attachable/detachable electrical connections as the FRU removed from the compute system 100 and/or any of the other FRUs in the compute system 100. A replacement FRU may also include components that are able to seamlessly reestablish wireless connections, communication channels, storage capacity, etc., depending on the implementation.

The FRUs 102, 104, 106, 108 are each electrically connected to a processor 110. The processor 110 is also connected to a number of FRUs 152 at a secondary system 150 over a network 112. It follows that the processor 110 is able to communicate (e.g., exchange information, data, requests, instructions, etc.) with any of the FRUs 102, 104, 106, 108, 152 as desired. It may even be beneficial to monitor performance of the various FRUs 102, 104, 106, 108, 152. In some implementations the processor 110 is a baseboard management controller. However, the processor 110 may be of any desired type.

As noted above, FRUs are typically electrical devices that can be removed from a more complex electrical system or another piece of electronic equipment, and replaced. FRUs thereby allow for specific portions of a larger system to be replaced. This allows for issues to be resolved without repairing or replacing the system as a whole. While FRUs typically include at least some electrical components, in some implementations one or more FRUs may be a mechanical device, a raw material, a specific shape, etc.

While FRUs add desirable granularity to the process of repairing larger systems, conventional implementations have sparse information, are difficult to access, and cause significant inefficiencies for the system as a whole. There is also no historical information stored for these FRUs, making it impossible to know what has previously happened to the FRUs. As a result, conventional implementations have suffered significant inefficiencies attempting to implement and manage FRUs. Moreover, these inefficiencies have been unresolved.

In sharp contrast, various ones of the implementations included herein are able to significantly improve performance of the system. For instance, by selectively configuring FRUs to store information associated with status, any errors, past performance, etc., the system as a whole is able to operate more efficiently. This stored information may be used to monitor the FRUs and maintain desirable performance of the overarching system. For example, status and error information stored at the FRUs may be evaluated to identify an FRU that is beginning to experience an unnatural number of errors. This faulty FRU can be identified and replaced before experiencing a critical error that causes the system to go offline.

Again, by selectively configuring FRUs to store information associated with status, any errors, past performance, etc., the system as a whole is able to operate more efficiently. For instance, each of the FRUs 102, 104, 106, 108 are shown in FIG. 1A as including memory 114. Similarly, the FRUs 152 of the secondary system 150 also each include memory 114. The type, size (e.g., storage capacity), location, etc. of the memory 114 may vary for each of the FRUs 102, 104, 106, 108, 152. For example, the specific memory 114 used in a given implementation may depend on the type of FRU, the type of system, user preferences, industry standards, etc.

The memory 114 is preferably used to store information associated with the corresponding FRU. For example, the FRU 104 may be an electrical component included in a data storage module, while the FRU 106 is an electrical component included in a server. Accordingly, the memory 114 in the FRU 104 may store information associated with data being stored and/or accessed at the data storage module, while the memory 114 in the FRU 106 stores information associated with operation of the server. Information may be stored in the memory 114 of the FRUs according to any of the implementations included herein (e.g., see methods 200 and 300 of FIGS. 2A and 3).

Figure 1B:
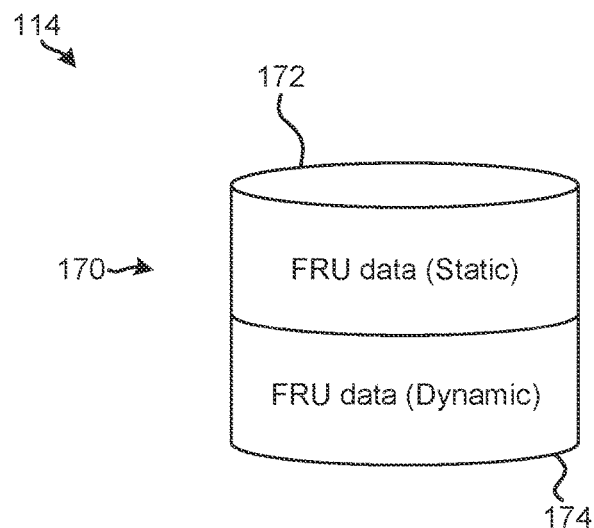
FIG. 1B is a partial detailed view of an internal memory of FIG. 1A, according to certain aspects of the present disclosure.

Looking now to FIG. 1B, a detailed view of an illustrative memory module 170 is shown in accordance with one implementation. As an option, the present memory module 170 may be implemented in conjunction with features from any other embodiment listed herein, such as those described with reference to the other FIGS., such as FIG. 1A. However, such memory module 170 and others presented herein may be used in various applications and/or in permutations which may or may not be specifically described in the illustrative embodiments listed herein. Further, the memory module 170 presented herein may be used in any desired environment. Thus FIG. 1B (and the other FIGS.) may be deemed to include any possible permutation.

As shown, the simplified view of the memory module 170 includes a static portion 172 in addition to a dynamic portion 174. The dynamic portion 174 of the memory module 170 includes physical memory components that can be written to (e.g., modified) in addition to being read. Types of memory configured like the dynamic portion 174 of the memory module 170 may be referred to as read-write memory. Alternatively, the static portion 172 includes physical memory components that can only be read. In other words, the physical components included in the static portion 172 of the memory module 170 are configured such that the information stored therein cannot be modified. For example, data may be written to the static portion 172 of the memory module 170 during the process of forming (e.g., manufacturing) the memory module 170, after which the data is locked and cannot be changed.

Information locked in the static portion 172 may include identifying information for the memory module 170, that was set by a manufacturer at the time of making the memory module 170. For example, information locked in the static portion 172 may include a manufacture date, manufacturing company, product identifiers (e.g., names), serial identifiers (e.g., numbers), etc. Preventing this information from being changed at a later point by a user prevents components from being mislabeled and/or misidentified.

Alternatively, information stored in the dynamic portion 174 of the memory module 170 may be updated as desired. For example, data may be selectively erased, modified, rewritten, etc. as desired. It follows that the dynamic portion 174 of the memory module 170 may store information that changes over time. For example, information corresponding to the operational state of the corresponding FRU and/or larger subsystem the FRU is implemented in may be stored in the dynamic portion 174 of the memory module 170. This operational information may further be updated as performance changes over time. It follows that various ones of the implementations included herein are desirably able to monitor performance over time and take preventative actions rather than waiting for a critical failure to react to. Again, conventional products have been unable to achieve this improvement.

As noted above, the type, size (e.g., storage capacity), location, etc. of memory included in each of the static and dynamic portions 172, 174 may vary for each of the FRUs 102, 104, 106, 108, 152. For example, the specific memory used in a given implementation may depend on the type of FRU, the type of system, user preferences, industry standards, etc. For example, the memory 114 in any of the FRUs 102, 104, 106, 108, 152 may include electrically erasable programmable read-only memory (EEPROM). As the name suggests, EEPROM is typically configured as read-only memory such that data stored thereon cannot be changed. The static portion 172 of the memory 114 may be kept in a standard format such that it remains in a read-only configuration. However, the dynamic portion 174 in the present example may be achieved by reconfiguring the EEPROM memory 114 into read-write memory. As a result, the physical components in the dynamic portion 174 of the EEPROM memory may actually be modified (e.g., written to) in addition to being read.

Implementing a dynamic portion of memory in each FRU of a system allows for dynamic information to be stored locally at each FRU. For instance, each FRU 102, 104, 106, 108, 152 may record current status information in the dynamic portion 174 of the memory 114. Each of the FRUs may thereby be simply queried to determine the current status of the respective FRU. Other useful information may also be maintained in the dynamic portion 174 of the memory 114. For instance, error status information (e.g., error counts corresponding to each of the FRUs), a record of previously performed operations, logical-to-physical lookup tables, etc., or any other desired type of information may be stored in the dynamic portion 174 of the memory 114 in any of the FRUs 102, 104, 106, 108, 152. Moreover, the information stored in the memory 114 at any of the FRUs 102, 104, 106, 108, 152 may be managed according to any of the implementations included herein. For instance, the FRUs 102, 104, 106, 108, 152 may include a processor (not shown) that is able to manage the static and dynamic portions 172, 174 of the memory 114, e.g., as will soon become apparent.

Figure 2A:
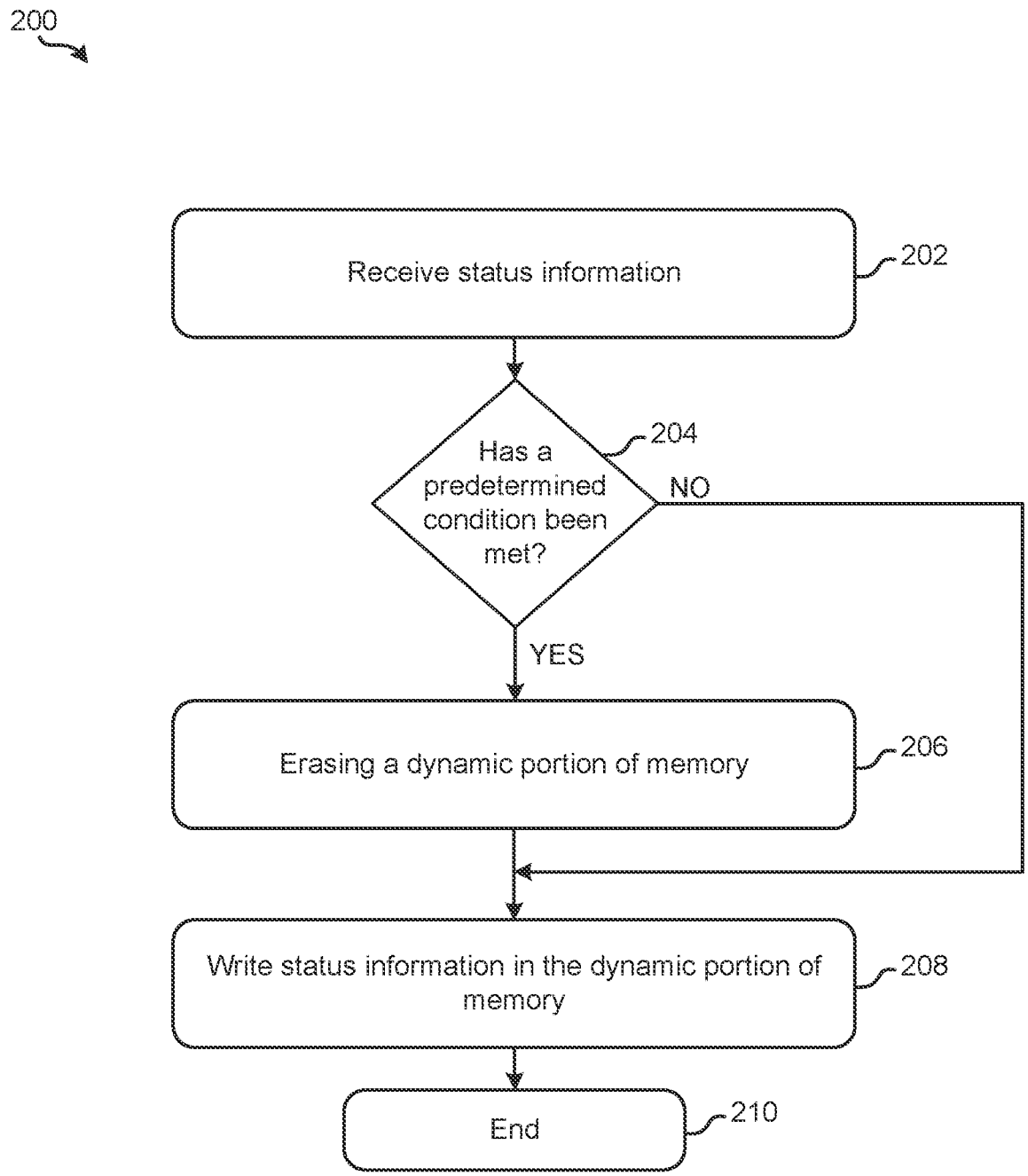
FIG. 2A is a flowchart of an example method for managing a system having FRUs, according to certain aspects of the present disclosure.

Looking now to FIG. 2A, a computer-implemented method 200 for managing a system having FRUs is illustrated in accordance with one implementation. Accordingly, some of the operations in the method 200 are described as being performed by a processing unit in communication with a number of different FRUs. However, this is in no way intended to be limiting. For instance, the method 200 may be performed in accordance with any of the implementations associated with FIGS. 1A-1B, among others. Of course, more or less operations than those specifically described in FIG. 2A may be included in the method 200, as would be understood by one of skill in the art upon reading the present descriptions.

Each of the steps of the method 200 may be performed by any suitable component of the operating environment. For instance, one or more of the operations in the method 200 have been described below as being performed by a processor that is connected to a number of FRUs (e.g., see processor 110 of FIG. 1A). In one implementation, the processor is a baseboard management controller. In various other implementations, the method 200 may be partially or entirely performed by a controller, a combination of logic gates, a computer, etc., or some other device having one or more processors therein. Thus, in some embodiments, the method 200 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2A, operation 202 of the method 200 includes receiving status information corresponding to a number of FRUs. As noted above, operation 202 may be performed by a processing unit in communication with a number of different FRUs. The FRUs may be implemented across one or more systems, e.g., such as a computing server, providing an easily replaceable portion of a more complex system. Again, this allows for issues to be resolved without repairing or replacing the system as a whole.

Accordingly, the status information may be received directly from the FRUs in some approaches. In other approaches, the status information from a number of FRUs may be accumulated in a buffer and eventually received at operation 202 in response to a predetermined amount of data being collected. It follows that the status information may be received from one or more different locations.

In one example, Basic Input/Output System (BIOS) may be initiated in response to a compute system being powered up from a low power or off state. The BIOS includes firmware that can be used to provide runtime services for operating systems and programs in servers and other systems. In some implementations, BIOS performs a hardware initialization procedure while the system is being powered up (e.g., during a "booting" process). The hardware initialization procedure may involve querying each FRU in the system to determine a current status of the respective FRUs while and/or after being powered on. Any information collected during this hardware initialization procedure may thereby be received at operation 202 in some implementations.

The types of status information received in operation 202 may vary depending on the implementation. For instance, the status information may correspond to a number and/or type of errors that have previously occurred at the corresponding FRUs. In other implementations, the status information includes current operating states of the FRUs, a most recently completed operation, an unused amount of memory in each of the FRUs, etc., or any other status information that may be desirable given the implementation.

Proceeding to operation 204, a decision is made as to whether a predetermined condition has been met. In other words, operation 204 is a decision that determines whether one or more predetermined conditions have been satisfied. This decision is preferably made using the status information received at operation 202. It follows that operation 204 may also include evaluating the status information received from the various FRUs. The status information may be evaluated by comparing values to different thresholds, identifying the presence and/or absence of certain types of status information, interpreting metadata associated with the status information, etc.

Figure 2B:
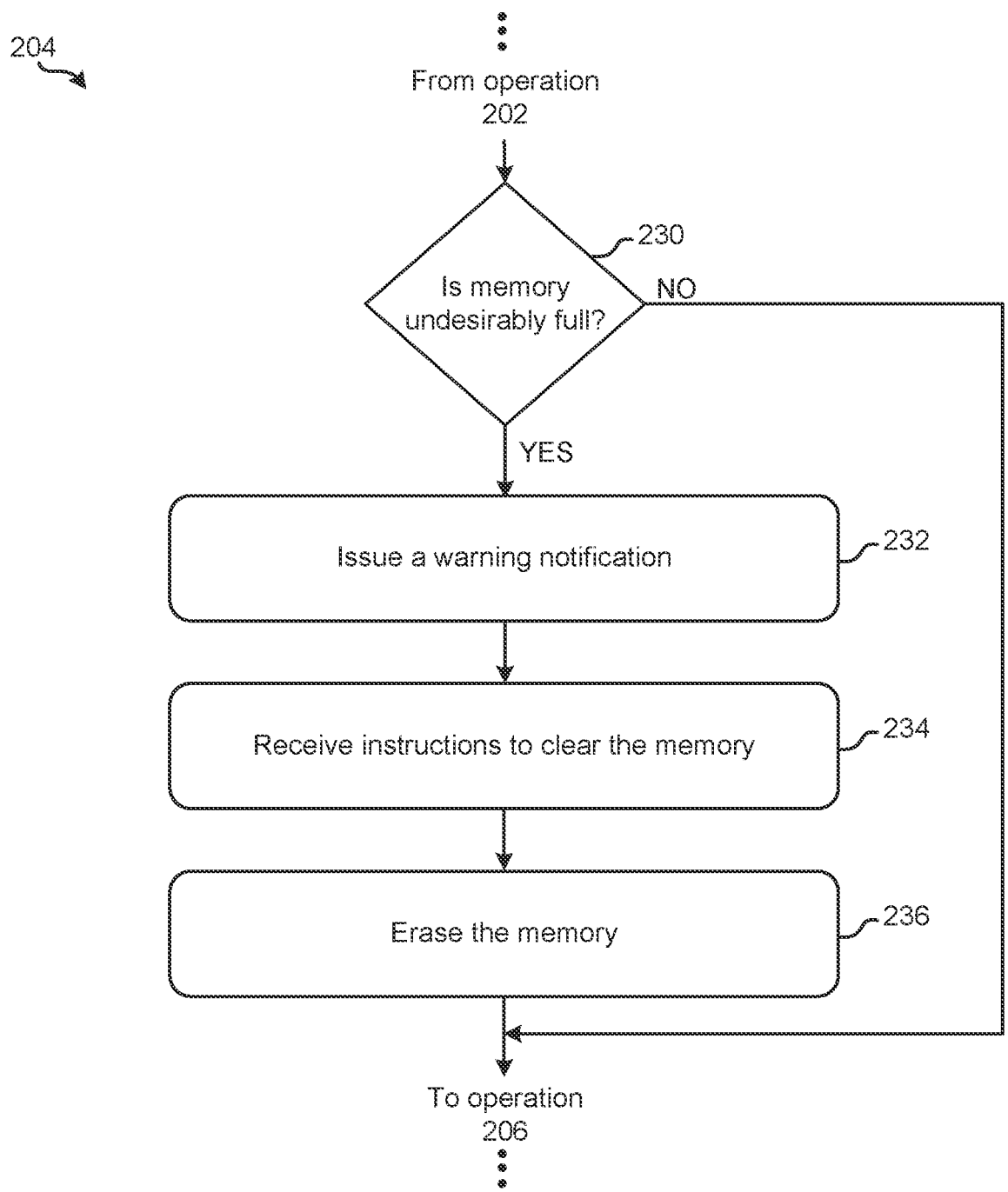
FIG. 2B is a flowchart of sub-operations for one of the operations in the method of FIG. 2A, according to certain aspects of the present disclosure.

These predetermined conditions may be used to identify situations where it is desirable that one or more specific actions are taken. For instance, some implementations include determining whether memory in any of the FRUs is undesirably full and at risk of experiencing a memory overflow situation. Referring momentarily now to FIG. 2B, exemplary sub-operations of identifying whether the predetermined condition has been met for a specific one of the FRUs having memory therein are illustrated in accordance with one implementation. Accordingly, one or more of the sub-operations in FIG. 2B may be used to perform operation 204 of FIG. 2A for any of the FRUs. However, it should be noted that the sub-operations of FIG. 2B are illustrated in accordance with one implementation which is in no way intended to limit the invention.

Sub-operation 230 includes determining whether a current fill level of the memory in the FRU is outside a predetermined range. In other words, sub-operation 230 includes determining whether an unused amount of the memory in the FRU is undesirably low. It follows that the predetermined range may depend on the type of memory, user preferences, past performance, predicted workloads, etc. It should also be noted that "outside a predetermined range" is in no way intended to limit the invention. Rather than determining whether a value is outside a predetermined range, equivalent determinations may be made, e.g., as to whether a value is within a predetermined range, whether a value is above a threshold, whether an absolute value is above a predetermined threshold, whether a value is below a threshold, etc., depending on the desired approach.

As noted above, the FRU may include different types of memory therein depending on the implementation, but in preferred approaches, the FRU includes EEPROM. The EEPROM in each of the FRUs may further include a static portion as well as a dynamic portion therein. As noted above, the static portion may be configured as read-only memory and can be used to store any desired (preferably unchanging) information. The dynamic portion may be configured as a read-write memory that may be written to (e.g., modified) as well as read. It follows that certain data may be locked in the static portion of memory, while other data may be updated over time in the dynamic portion of memory.

While having a portion of dynamic memory desirably allows for data to be updated over time, it also makes the memory susceptible to being overfilled and experiencing overflow situations. Thus, in response to determining the unused storage capacity of a FRU is undesirably high and outside a predetermined range, an erase sub-operation may be issued to reclaim at least a portion of the used memory, e.g., as will soon become apparent.

Referring still to FIG. 2B, the flowchart proceeds from sub-operation 230 to sub-operation 232 in response to determining the current fill level of the memory is outside the predetermined range. There, sub-operation 232 includes issuing a warning notification. The warning notification may be sent to a user of the system, to a system administrator, to a predetermined contact, etc. The warning notification may additionally or alternatively be shown on a display screen of the respective FRU, sent over a network, etc.

In some implementations, the warning notification sent in sub-operation 232 requests feedback from the intended recipient. In other words, the warning notification may inform the intended target of the undesirably high fill level in memory, and request input on how the issue should be resolved. In some instances, the warning notification may prompt the target with available options, may provide an example of a possible response, etc. Accordingly, in some implementations, instructions are received in response to sending the warning notification. The instructions may identify how to process the memory. For example, in some situations the instructions may involve deleting information from the memory to increase the amount of unused storage capacity that is included therein. In other situations, the instructions may include at least temporarily taking the FRU offline, contacting a service technician, forwarding the warning notification along to a manufacturer, etc.

Referring still to the implementation illustrated in FIG. 2B, sub-operation 234 includes receiving instructions to clear the memory. In other words, the processor performing the sub-operations of FIG. 2B is instructed to erase the memory. The instructions received at sub-operation 234 may only pertain to a dynamic portion of memory in some implementations. As noted above, some memory includes a dynamic portion that may be modified (e.g., read/write memory), as well as a static portion that is read-only.

In response to receiving the instructions at sub-operation 234, FIG. 2B proceeds to sub-operation 236. There, sub-operation 236 includes erasing the memory. For instance, in some implementations sub-operation 236 includes erasing information stored in a dynamic portion of EEPROM (e.g., see static portion 172 of FIG. 1B). Moreover, information may be erased from dynamic portions of EEPROM at any of the FRUs in response to other predetermined conditions being met. For instance, the dynamic portion of EEPROM may be erased periodically, automatically in response to reaching a predetermined fill level, in response to not receiving a response to the request sent in sub-operation 232, in response to receiving a specific command from a user, etc. In some implementations, a dynamic portion of EEPROM may be erased automatically in response to receiving instructions to write an entry in the dynamic portion. In other words, the dynamic portion of EEPROM may be configured to act as a single-entry buffer configured to overwrite any present entry with a newly received entry.

From sub-operation 236, the flowchart returns to operation 206 of FIG. 2A. There, operation 206 of the method 200 includes sending one or more instructions to erase a dynamic portion of memory. In other words, operation 206 includes instructing memory to clear read/write memory. According to an example, the dynamic portion of EEPROM at an FRU may be erased in response to a predetermined condition being met. It should also be noted that the flowchart proceeds directly from sub-operation 230 back to operation 206 of FIG. 2A in response to determining that the memory is not undesirably full (e.g., an amount of unused capacity remains above a threshold).

Referring still to FIG. 2A, operation 208 includes writing status information in the dynamic portion of memory. Each FRU may only store status information that corresponds to itself. Thus, operation 208 preferably includes writing the status information for a given FRU in the dynamic portion of memory in that given FRU.

Depending on the implementation, the dynamic portion of memory may be empty (recently erased) or partially filled while status information is being written therein. It follows that the process of writing the status information in the dynamic portion of memory may be implemented differently.

From operation 208, the flowchart of FIG. 2A proceeds to operation 210, whereby the method 200 may end. However, it should be noted that although the method 200 may end upon reaching operation 210, any one or more of the processes included in the method 200 may be repeated in order to record additional status information. In other words, any one or more of the processes included in the method 200 may be repeated to implement additional status information and continue managing a system having FRUs. It should also be noted that the method 200 proceeds directly from operation 204 to operation 208 in response to determining that a predetermined condition has not been met. In other words, the status information is written to the memory without first erasing memory in response to determining that a condition has not been met.

It follows that the method 200 is able to successfully and efficiently manage the FRUs in a system. Various types of information associated with FRUs and the larger systems which they are integrated with may be collected and stored. Thus, various ones of the implementations herein are able to access and utilize information that was previously inaccessible. This information may also be accessed in an efficient manner as a result of how the information is stored.

While the implementations herein are able to operate at a high level of efficiency and success (particularly in comparison to conventional products), errors still occur during operation. For example, one or more of the FRUs, memory components, processors, larger systems, etc., may experience a physical failure (e.g., a disconnected wire, shorted circuit, etc.). In other instances, software related errors may occur, e.g., such as becoming stuck in a logic loop, data corruption, etc. It follows that errors may occur at any time.

Figure 3:
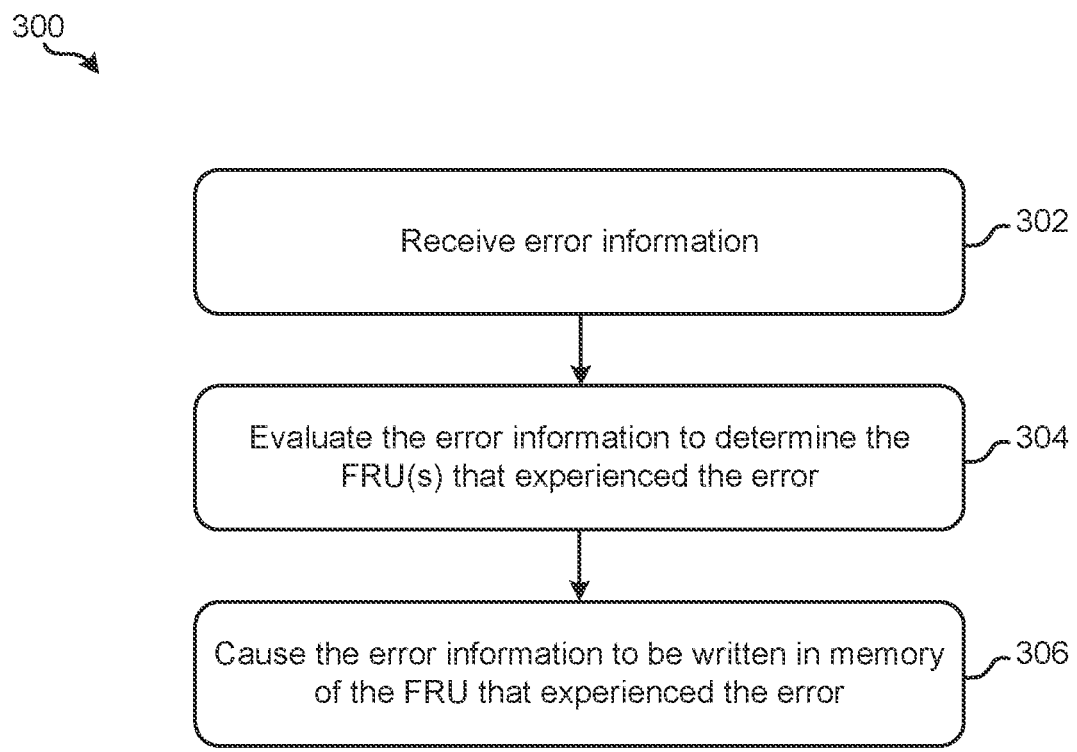
FIG. 3 is a flowchart of an example method for responding to an error event, according to certain aspects of the present disclosure.

Looking to FIG. 3, a flowchart of a method 300 for responding to an error event is shown according to one implementation. The method 300 may be performed in accordance with the present invention in any of the environments depicted in FIGS. 1A-2B, among others, in various implementations. Of course, more or less operations than those specifically described in FIG. 3 may be included in the method 300, as would be understood by one of skill in the art upon reading the present descriptions.

Each of the steps of the method 300 may be performed by any suitable component of the operating environment. For example, one or more of the operations in the method 300 may be performed by a processor in the background. It follows that performing one or more of the operations in the method 300 may not impact performance of other running applications, methods (e.g., see method 200 of FIG. 2A above), etc. The method 300 may be partially or entirely performed by a controller, a processor, a computer, etc., or some other device having one or more processors therein. Thus, in some implementations, the method 300 may be a computer-implemented method. Moreover, the terms computer, processor and controller may be used interchangeably with regards to any of the implementations herein, such components being considered equivalents in the many various permutations of the present invention.

Moreover, for those implementations having a processor, the processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, operation 302 of the method 300 includes receiving error information. The error information typically corresponds to an error that occurred at one of the FRUs of a system. Accordingly, the error information may include a status of the FRU that experienced the error, the type of error experienced, a total error count of the FRU that experienced the error, etc. According to one example which is in no way intended to be limiting, error information may be collected and stored in a system event log (SEL). The SEL may thereby be analyzed to determine the type of error that occurred and at which of the FRUs.

However, it should be noted that if no error information is received in a particular implementation (e.g., during a "booting" process), an FRU status may be set to a "normal" value, an error count may be set to zero, and an error type may be set as "NULL." This allows users to quickly and efficiently determine whether an FRU is installed successfully and/or whether any errors have been experienced.

In some implementations, the error information received in operation 302 was automatically sent from the FRU that experienced the error. In other words, each of the FRUs may be preprogrammed to automatically send error information to a central processor (e.g., see processor 110 of FIG. 1A) in response to experiencing an error. With respect to the present description, it should be noted that an "error" may involve one or more physical failures (e.g., a disconnected wire, shorted circuit, etc.), logical failures (e.g., becoming stuck in a logic loop, data corruption, pointer errors, etc.), etc., or any type of undesirable change in performance. It follows that the error information may include any data, metadata, settings, etc., that are associated with the error that occurred. For example, the error information may include a snapshot of all data and logical settings at the FRU just before the error (e.g., failure). As noted above, this snapshot may be automatically sent to the central processor in response to the error occurring.

While the error information received includes information about the error that occurred, it may not be readily apparent which FRU experienced the error. For instance, the error information sent may be limited as a result of the error that occurred. Accordingly, operation 304 includes evaluating the error information to determine a specific one of the FRUs that experienced the error.

In response to determining the FRU that experienced the error, the method 300 proceeds to operation 306. There, operation 306 includes causing the error information to be written in memory of the FRU that experienced the error. In other words, operation 306 includes sending one or more instructions to the specific FRU determined as having experienced the error, the one or more instructions causing the error information to be written to memory in the specific FRU. As noted above, each FRU may include EEPROM having a dynamic portion and a static portion. The error information may thereby preferably be written to the dynamic portion of the EEPROM in the FRU that experienced the error.

Figure 1C:
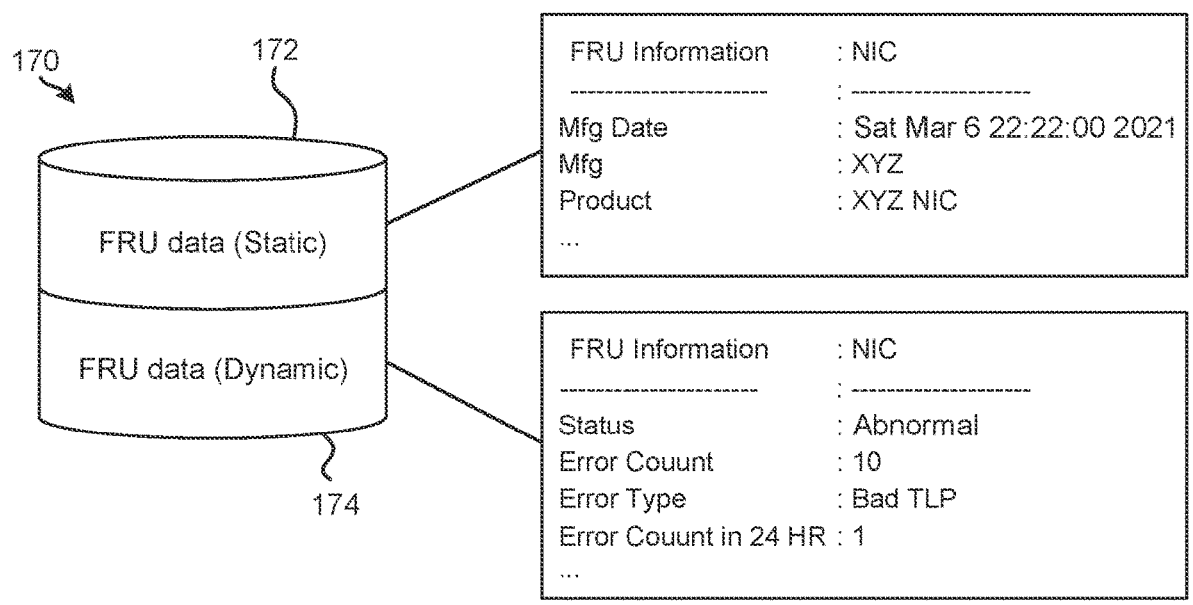
FIG. 1C is a representational view of information stored in each portion of internal memory of FIG. 1A, according to certain aspects of the present disclosure.

Referring momentarily to FIG. 1C, an in-use example of storing error information in dynamic portion 174 of memory 170 from FIG. 1B is illustrated. In this example, the network interface card may be identified as having a bad Transaction Layer Packet (TLP) error that has occurred ten times in the last 24 hours. As a result, the status of the FRU may be changed to "Abnormal", error count become "10", error type become "Bad TLP" and error count in 24 HR become "10". This can help users to clarify what device has error and what kind of error happens.

Storing error information and/or status information in memory at the respective FRUs desirably reduces latency and simplifies data access for users. For instance, a status request received for a specific FRU may be satisfied by simply directing the status request to the specific FRU it corresponds to. In some implementations, the status request may be directed to the FRU of interest by updating the target location for the status request. In other implementations, the status request received may be used to form a new (similar) status request that is sent to the FRU of interest. It follows that the status request and other types of requests may be satisfied without accessing a host operating system or performing similar types of exchanges that lead to increased latency.

A response is preferably received after directing the status request to the FRU of interest. In such situations, the status information may be received directly from the FRU of interest. As noted above, each FRU may be in communication with a central processor that may receive the status information directly from the FRU storing the status information. Moreover, this received status information may be used to satisfy the initially received status request, e.g., as would be appreciated by one skilled in the art after reading the present description. Again, implementations included herein improve the efficiency by which requests can be satisfied.

Figure 4:
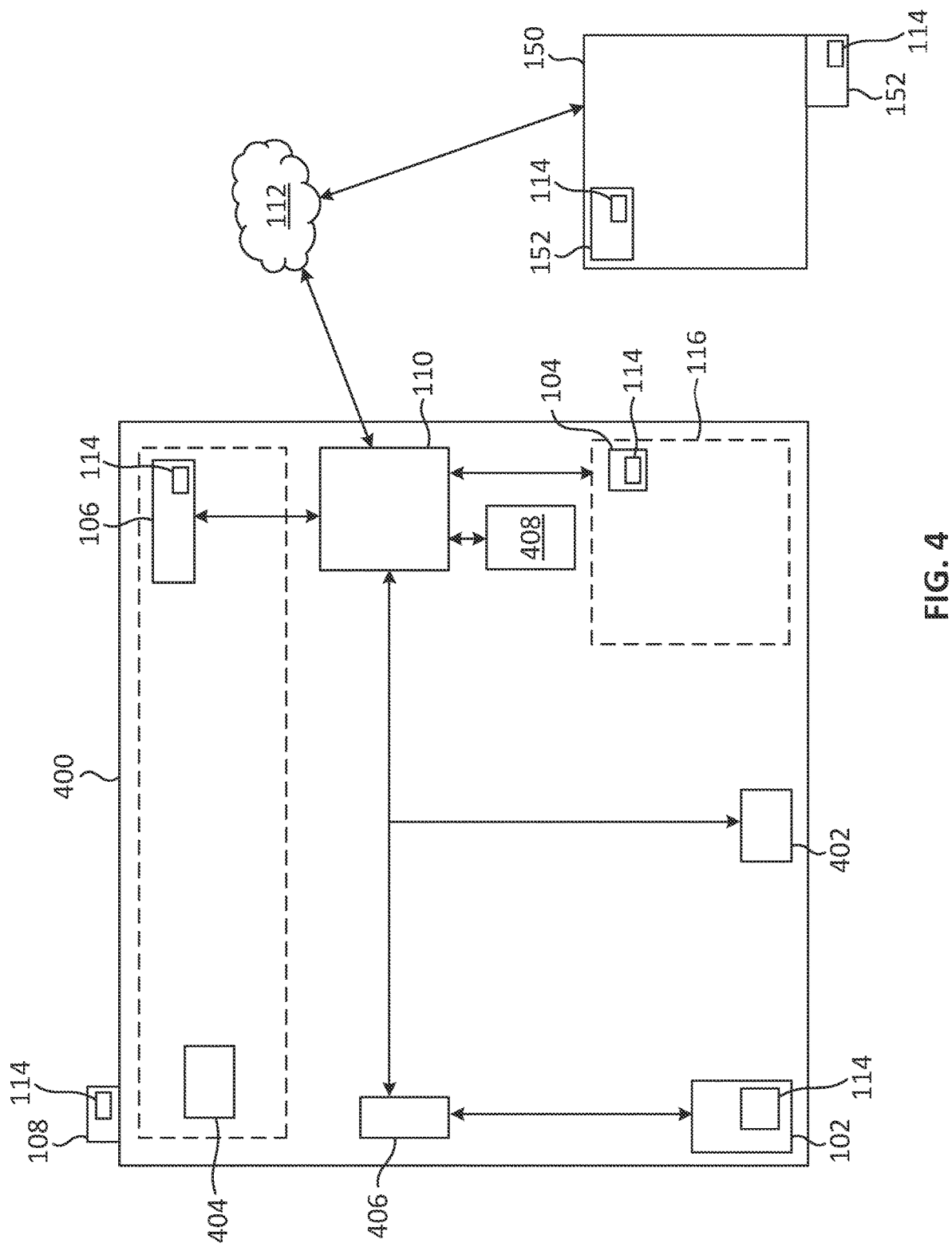
FIG. 4 is a representational view of a system architecture having a central memory, according to certain aspects of the present disclosure.

While various ones of the implementations herein have been presented as including memory at each of the FRUs to store information, this is in no way intended to be limiting. For instance, one or more FRUs in a system may be too small, have too weak of a power supply, etc. to implement internal memory. Accordingly, any of the implementations included herein may have a central portion of memory used to store status information, error information, historical performance data, etc., for any of the FRUs. Referring momentarily now to FIG. 4, variations of the embodiment of FIG. 1A depicting exemplary configurations of FRUs are presented in accordance with one implementation. Accordingly, various components of FIG. 4 have common numbering with those of FIG. 1A.

Looking to FIG. 4, the system 400 is shown as including the FRUs 102, 104, 106, 108, 152 having internal memory 114, e.g., as described above. However, additional FRUs 402, 404, 406 are also included in the system 400. As shown, each of the additional FRUs 402, 404, 406 do not include internal memory (e.g., EEPROM). Rather, each of the FRUs 402, 404, 406 are electrically connected to a central memory 408. Each of these FRUs 402, 404, 406 may thereby access (e.g., write to, read from, erase from, etc.) the central memory 408. In some implementations, each of the FRUs 402, 404, 406 have a different portion of the central memory 408. In other implementations, the FRUs 402, 404, 406 share one or more portions of the central memory 408. According to an example, which is in no way intended to limit the invention, one or more of the additional FRUs 402, 404, 406 do not include internal memory like EEPROM may be Dual In-line Memory Modules (DIMMs).

It follows that the processor 110 may communicate with each of the FRUs 102, 104, 106, 108, 152, 402, 404, 406, but may have limited control over certain ones of the FRUs in some instances. For instance, the processor 110 may receive status information from devices that do not include internal memory (e.g., does not include EEPROM therein). Accordingly, the processor 110 may be prevented from storing the status information in the FRU itself. Rather, the received status information may be stored in a dynamic portion of a central EEPROM having the dynamic portion and a read-only (also referred to herein as "static") portion.

As noted herein, various ones of the implementations are able to significantly improve operational efficiency of the system without limiting performance. This is accomplished at least in part by performing a same number of steps (e.g., operations) in a shorter amount of time than conventionally possible. In other words, implementing approaches included herein will allow for a controller to perform a given number of data operations in a shorter amount of time than conventionally achievable. As noted herein, preferred implementations are able to improve the accessibility of information associated with FRUs and the systems they are integrated with. For instance, by storing status information, error information, past performance information, etc. at the FRU locations allows for the system to operate more efficiently.

This effectively reduces the amount of latency that corresponds to each of the data operations that are performed. In other words, issues (e.g., errors) may also be resolved more quickly with access to the information stored in memory at the FRU that experienced the issue. As the number of data operations that are performed, the size of data storage systems and/or operating architectures in general, etc. significantly increase, the compute performance improvements achieved by the various approaches herein will be compounded, thereby leading to further measurable and significant improvements over what was previously achievable. Performance may be improved even further by implementing machine learning techniques to identify additional operating efficiencies.

Not only do implementations included herein reduce data access times, they also reduce the number of steps that are performed to satisfy a data operation. As a result, the system performs less computational work while also being able to increase operational throughput.

It should also be noted that the various implementations herein may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It follows that although various aspects of the implementations herein have been illustrated as including specific designs, orientations, numbers of components, etc., this is in no way intended to limit the invention. Rather, the implementations herein are presented for exemplary purposes only and may vary in design, orientation, number of components, etc., depending on the desired approach. It should also be noted that use of the terms "bottom", "lower", "top", "upper", etc., are in no way intended to be limiting. Any frames of reference used to describe the various implementations herein have been selected for illustrative purposes only and may be adjusted as desired.

It should also be noted that, while the disclosed implementations have been illustrated and described with respect to one or more approaches, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

It should also be understood that various implementations of the present disclosure have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computer-implemented method for managing a compute system with field replace units, the computer-implemented method comprising:
    receiving status information corresponding to the field replace units, the status information being collected from the field replace units in response to the compute system being powered on;
    in response to a predetermined condition being met, sending, for each of the field replace units, one or more instructions to erase a dynamic portion of electrically erasable programmable read-only memory (EEPROM) located at a respective field replace unit, the EEPROM at the respective field replace unit having the dynamic portion and a read-only portion;
    sending, for each of the field replace units, one or more instructions to write a portion of the status information corresponding to the respective field replace unit in the dynamic portion of the EEPROM at the respective field replace unit;
    receiving a status request for one of the field replace units;
    directing the status request to the one of the field replace units;
    receiving status information directly from the one of the field replace units; and
    using the received status information to satisfy the status request.

2. The computer-implemented method of claim 1, wherein identifying whether the predetermined condition has been met includes:
    determining whether a current fill level of the dynamic portion of EEPROM is outside a predetermined range;
    in response to determining that the current fill level of the dynamic portion of EEPROM is outside the predetermined range, issuing a warning notification; and
    in response to being instructed to clear the dynamic portion of EEPROM, sending the one or more instructions to erase the status information stored in the dynamic portion of EEPROM.

3. The computer-implemented method of claim 1, wherein the predetermined condition is met in response to receiving the status information corresponding to the field replace units.

4. The computer-implemented method of claim 1, comprising:
    receiving error information corresponding to an error that occurred at one of the field replace units;
    evaluating the error information to determine the one of the field replace units that experienced the error; and
    sending one or more instructions to the one of the field replace units, the one or more instructions causing the error information to be written in the dynamic portion of EEPROM at the one of the field replace units.

5. The computer-implemented method of claim 1, wherein the error information includes one or more details selected from the group consisting of a status of the field replace unit that experienced the error, an error type, and an error count of the field replace unit that experienced the error.

6. The computer-implemented method of claim 1, further comprising:
    receiving status information from memory devices that do not include EEPROM, the memory devices being part of the compute system; and
    storing the received status information in a dynamic portion of a central EEPROM, the central EEPROM having the dynamic portion and a read-only portion.

7. The computer-implemented method of claim 1, wherein the status information includes error counts corresponding to the field replace units, the read-only portion of the EEPROM at each field replace unit storing static information associated with the respective field replace unit, the static information including a manufacture date, manufacturer, product identifier, and serial number.

8. The computer-implemented method of claim 1, wherein the computer-implemented method is performed by a baseboard management controller.

9. A computer program product for managing a compute system with field replace units, the computer program product comprising a computer readable storage medium having program instructions embodied therewith, the program instructions readable and/or executable by a processor to cause the processor to:
    receive, by the processor, status information corresponding to the field replace units, the status information being collected from the field replace units in response to the compute system being powered on;
    in response to a predetermined condition being met, send, by the processor for each of the field replace units, one or more instructions to erase a dynamic portion of electrically erasable programmable read-only memory (EEPROM) located at a respective field replace unit, the EEPROM at the respective field replace unit having the dynamic portion and a read-only portion;
    send, by the processor for each of the field replace units, one or more instructions to write a portion of the status information corresponding to the respective field replace unit in the dynamic portion of the EEPROM at the respective field replace unit;
    receive, by the processor, a status request for one of the field replace units;
    direct, by the processor, the status request to the one of the field replace units;
    receive, by the processor, status information directly from the one of the field replace units; and
    use, by the processor, the received status information to satisfy the status request.

10. The computer program product of claim 9, wherein identifying whether the predetermined condition has been met includes:

determining whether a current fill level of the dynamic portion of EEPROM is outside a predetermined range;

in response to determining that the current fill level of the dynamic portion of EEPROM is outside the predetermined range, issuing a warning notification; and in response to being instructed to clear the dynamic portion of EEPROM, sending the one or more instructions to erase the status information stored in the dynamic portion of EEPROM.

11. The computer program product of claim 9, wherein the predetermined condition is met in response to receiving the status information corresponding to the field replace units.

12. The computer program product of claim 9, wherein the program instructions are further readable and/or executable by the processor to cause the processor to:

receive, by the processor, error information corresponding to an error that occurred at one of the field replace units;

evaluate, by the processor, the error information to determine the one of the field replace units that experienced the error; and send, by the processor, one or more instructions to the one of the field replace units, the one or more instructions causing the error information to be written in the dynamic portion of EEPROM at the one of the field replace units.

13. The computer program product of claim 9, wherein the error information includes one or more details selected from the group consisting of a status of the field replace unit that experienced the error, an error type, and an error count of the field replace unit that experienced the error.

14. The computer program product of claim 9, wherein the program instructions are further readable and/or executable by the processor to cause the processor to:

receive, by the processor, status information from memory devices that do not include EEPROM, the memory devices being part of the compute system; and store, by the processor, the received status information in a dynamic portion of a central EEPROM, the central EEPROM having the dynamic portion and a read-only portion.

15. The computer program product of claim 9, wherein the status information includes error counts corresponding to the field replace units, the read-only portion of the EEPROM at each field replace unit storing static information associated with the respective field replace unit, the static information including a manufacture date, manufacturer, product identifier, and serial number.

16. The computer program product of claim 9, wherein the program instructions are performed by a baseboard management controller.

17. A compute system, comprising:

a plurality of field replace units, each of the field replace units including electrically erasable programmable read-only memory (EEPROM) having a dynamic portion and a read-only portion;

a processor; and logic integrated with and/or executable by the processor, the logic being configured to:

receive, by the processor, status information corresponding to the field replace units, the status information being collected from the field replace units in response to the compute system being powered on;

in response to a predetermined condition being met, send, by the processor for each of the field replace units, one or more instructions to erase the dynamic portion of the EEPROM at a respective field replace unit;

send, by the processor for each of the field replace units, one or more instructions to write a portion of the status information corresponding to the respective field replace unit in the dynamic portion of the EEPROM at the respective field replace unit;

receive, by the processor, a status request for one of the field replace units;

direct, by the processor, the status request to the one of the field replace units;

receive, by the processor, status information directly from the one of the field replace units; and use, by the processor, the received status information to satisfy the status request.

18. The compute system of claim 17, wherein the logic is further configured to:

receive, by the processor, error information corresponding to an error that occurred at a second one of the field replace units;

evaluate, by the processor, the error information to determine the second one of the field replace units that experienced the error; and send, by the processor, one or more instructions to the second one of the field replace units, the one or more instructions causing the error information to be written in the dynamic portion of EEPROM at the second one of the field replace units.

\* \* \* \* \*